3,212,165
SCARIFIER FOR ROLLERS OF RUBBER OR THE LIKE
Augustus J. Shank, Concord, Calif., assignor to United States Steel Corporation, a corporation of New Jersey
Filed Apr. 19, 1963, Ser. No. 274,249
3 Claims. (Cl. 29—76)

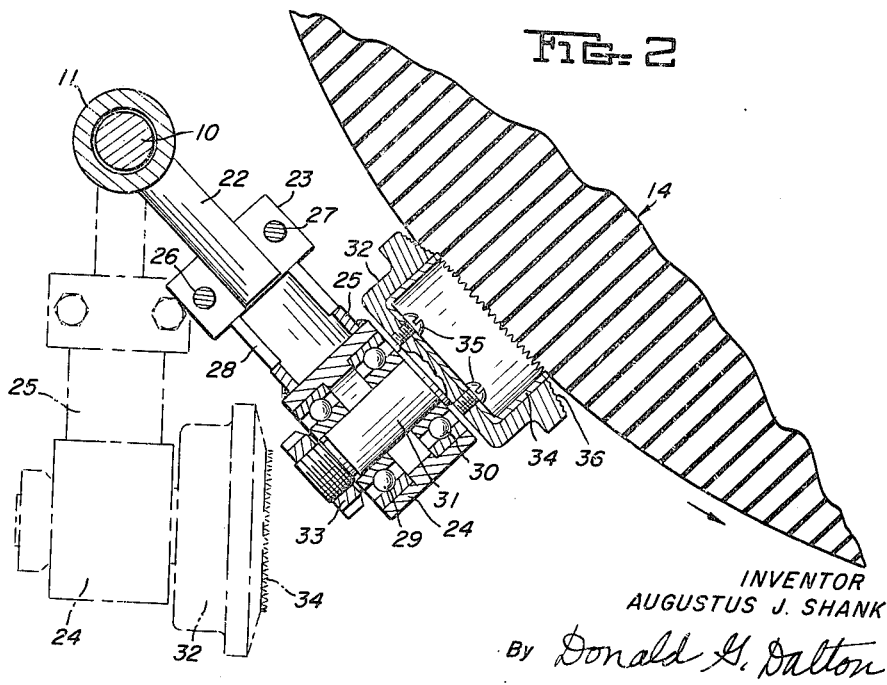

This invention relates to a scarifier for rubber rolls which may be used in a strip-processing line. The resulting scarification or abrasion aids in reducing the slippage between a roll face and the strip being processed.

The object of my invention is to provide improved apparatus adapted to scarify the face of a rotating work roll is scarified. Usually, sufficient force is applied to and from the roll, a shaft journaled in the bearing and a hole saw mounted on one end of the shaft. The saw when in contact with the roll face is rotated by such contact. This action slashes the rubber and results in a crepe-like surface.

More particularly, my invention comprises a fixed shaft member and a sleeve telescoped thereon, both journaled parallel to the roll axis, an arm extending radially from the inner end of the sleeve, second and third integral sleeves having axes normal to each other. The second sleeve is rotatably adjustable on the radial arm and the third sleeve mounts a bearing therein, the latter journaling a shaft mounting a ring thereon. The hole saw is seated in the ring and extends a short distance beyond the beveled edge of the ring. A handle is mounted on the outer end of the telescoped sleeve and is adapted to move the hole saw into engagement with the roll face.

The invention, in its preferred form, is shown in the accompanying drawings. In the drawings:

FIGURE 1 is a plan view of the apparatus, with portions of the roll housing shown in chain lines and the roll removed therefrom; and FIGURE 2 is an elevation taken on line II—II of FIGURE 1, showing the apparatus in operating position against a roll face and in chain lines in an inoperative position.

As shown in FIGURES 1 and 2, my scarifier or roll-creping apparatus comprises a bar or shaft 10 having a sleeve 11 telescoped thereon. Shaft 10 is fixed in a bushing 12 and sleeve 11 is journaled in a bushing 13. The bushings are coaxial and parallel to the axis of a rubber roll 14, and are bolted to brackets 15, 16, the latter being bolted to portions 17, 18 of the roll housing. Bar 10 is held in a fixed position by a set screw 19 in bushing 12. A set screw 20 in bushing 13 may be used to hold sleeve 11 and the appended apparatus in a fixed position. On the outer end of sleeve 11 a handle 21 is pinned in or otherwise attached thereto. The handle 21 permits sleeve 11 to be moved axially as well as rotated. This movement permits the apparatus extending radially of sleeve 11 to reciprocate in two directions, namely, to and from and parallel to the axis of roll 14.

Adjacent the inner end of sleeve 11, an arm or stub shaft 22, welded or otherwise attached thereto, extends radially therefrom. Rotatably adjustable on the free end of shaft 22 is an integral structure comprising two sleeves 23, 24, which may be welded together, but are shown as joined by a nipple 25. The axes of sleeves 23, 24 are substantially normal to each other. To mount sleeve 23 on shaft 22, cap screws 26, 27 pull together against the shaft, the two halves resulting from a diametrical saw cut 28, extending through sleeve 23 and partially through nipple 25.

Bearings 29, 30 are mounted in sleeve 24. A shaft 31 journaled in these bearings has a ring 32 mounted on one end thereof. A lock nut 33, threaded on the opposite end of shaft 31, retains the integral shaft-ring structure in position. A hole saw 34 or any similar toothed insert is seated in ring 32 with screws 35. For a purpose to be described, the cutting edge of hole saw 34 extends a short distance beyond the beveled, knurled, peripheral edge 36 of ring 32.

In using my apparatus, sleeve 23 is rotatably adjusted on shaft 22 so that the common axis of shaft 31 and ring 32 is generally normal to the axis of roll 14. When handle 21 is pushed toward roll 14, the hole saw 34 is driven into contact with the rotating roll 14. The saw is rotated thereby on bearings 29, 30 and the face of the roll is scarified. Usually, sufficient force is applied to the handle so that both the saw and the knurled edge of the ring are held in firm contact with the roll. The knurled edge provides a large frictional force to rotate the saw. The short distance the saw edge extends beyond the knurled edge of the ring predetermines the depth of the saw cut. The saw is reciprocated across the roll face until a uniformly scarified, crepe-like surface is provided.

While the several figures of the drawing show and the above explanation refers to a preferred apparatus for practicing my invention, other conditions of operation and structure may be used without departing from the spirit of the invention. Sleeve 11 telescoping on shaft 10 is shown as having an inner end portion of enlarged diameter. This lends additional strength to this portion. The predetermined length thereof also permits reciprocation of the hole saw across the entire roll face when the ends of the enlarged portion abut the respective supporting bushings. The fixed shaft portion and sleeve telescoped thereon may be replaced by a single, supporting shaft or a sleeve, journaled parallel to the roll axis between two bearings. Such a supporting member or members may be mounted at any point around the periphery of the roll, where free and safe access thereto is possible. However, it is preferred to mount this support to permit the saw to engage the roll in a quadrant below the horizontal. This permits easy manipulation of the handle and a falling away of the debris from the roll as it is being scarified.

The invention is characterized by several distinct advantages. In the first place, this self-energizing apparatus resurfaces rubber rolls while they are in operation, thus eliminating down time for roll change and resurfacing. In the second place, its use avoids delays due to slippage between strip and rubber rolls. Lastly, the apparatus does not require skilled labor to provide a predetermined, uniform depth of cut, when a roll is scarified.

Although I have disclosed herein the preferred apparatus of invention, I intend to cover as well any change or modification therein which may be made without departing from the spirit and scope of the invention.

I claim:

1. Apparatus for surface engagement with a roll-like workpiece mounted for rotation about its axis, comprising a supporting shaft journaled parallel to said axis of rotation, an arm fixed to and extending radially of said shaft, a bearing mounted on said arm with its axis normal thereto, a second shaft journaled in said bearing, a hole saw carried by said second shaft in endwise relation, exposed for engagement with the workpiece, whereby on rotation of said supporting shaft the axis of said second shaft is positioned generally normal to said axis of rotation and said saw is rotated upon contact thereof with said rotating workpiece and scarifies the face thereof.

2. Apparatus as defined in claim 1 characterized by said supporting shaft including a fixed portion and a sleeve telescoped thereon, a stub shaft depending adjacent the inner end of said sleeve, and second and third integral sleeves, the respective axes thereof being substantially normal to each other, said second sleeve being rotatably adjustable on the free end of said stub shaft, said third sleeve mounting said bearing therein.

3. Apparatus for surface engagement with a roll-like workpiece mounted for rotation on its axis, comprising a bearing, means mounting said bearing for reciprocation to and from said workpiece with its axis generally normal to said axis of rotation when said bearing is moved to said workpiece into an operative position, a shaft journaled in said bearing, a ring mounted on the end of said shaft adjacent said workpiece and having a peripheral edge beveled from the plane normal to said bearing axis, a hole saw mounted in said ring and extending a short distance beyond said edge, whereby on movement of said bearing, both said edge and said saw come in contact with said workpiece, are rotated thereby and the workpiece surface is scarified to a predetermined depth by said saw.

References Cited by the Examiner
UNITED STATES PATENTS

| | | | |
|---|---|---|---|
| 2,696,657 | 12/54 | Constantakis | 157—13 |
| 2,752,996 | 7/56 | Riggs | 157—13 |
| 2,754,905 | 7/56 | Kraft | 157—13 |
| 2,925,125 | 2/60 | Curry | 157—13 |

FOREIGN PATENTS

| | | |
|---|---|---|
| 174,501 | 1/35 | Switzerland. |

WILLIAM W. DYER, JR., *Primary Examiner.*

UNITED STATES PATENT OFFICE
CERTIFICATE OF CORRECTION

Patent No. 3,212,165                                      October 19, 1965

Augustus J. Shank

It is hereby certified that error appears in the above numbered patent requiring correction and that the said Letters Patent should read as corrected below.

Column 1, line 15, for "roll is scarified. Usually, sufficient force is applied to" read -- roll, comprising a bearing mounted for reciprocation to --.

Signed and sealed this 21st day of June 1966.

(SEAL)
Attest:

ERNEST W. SWIDER
Attesting Officer

EDWARD J. BRENNER
Commissioner of Patents